(12) United States Patent
Kwon et al.

(10) Patent No.: US 9,909,646 B2
(45) Date of Patent: Mar. 6, 2018

(54) DYNAMIC DAMPER FOR DRIVE SHAFT

(71) Applicant: Hyundai Motor Company, Seoul (KR)

(72) Inventors: Byoungho Kwon, Suwon-si (KR); Jung Seok Do, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 175 days.

(21) Appl. No.: 14/930,921

(22) Filed: Nov. 3, 2015

(65) Prior Publication Data

US 2016/0281817 A1 Sep. 29, 2016

(30) Foreign Application Priority Data

Mar. 27, 2015 (KR) ........................ 10-2015-0042905

(51) Int. Cl.
*F16F 15/32* (2006.01)
(52) U.S. Cl.
CPC ........ *F16F 15/322* (2013.01); *F16F 2222/02* (2013.01); *F16F 2224/0216* (2013.01); *Y10T 464/50* (2015.01)
(58) Field of Classification Search
CPC ..... F16D 2300/22; F16F 15/10; F16F 15/126; F16F 15/322; F16F 2222/02; F16F 2224/0216; Y10T 464/50
USPC ....................................................... 464/180
See application file for complete search history.

(56) References Cited

U.S. PATENT DOCUMENTS

| 4,132,578 | A | * | 1/1979 | Gell, Jr. ................. B29C 65/18 |
| | | | | 156/158 |
| 6,682,060 | B2 | | 1/2004 | Kato et al. |
| 7,946,925 | B2 | | 5/2011 | Kawakatsu et al. |

FOREIGN PATENT DOCUMENTS

| JP | 8-145117 A | 6/1996 |
| JP | 2003-322209 A | 11/2003 |
| JP | 2009-191995 A | 8/2009 |
| KR | 10-2005-0023952 A | 3/2005 |
| KR | 10-0811622 B1 | 3/2008 |
| KR | 10-1303572 B1 | 8/2013 |
| KR | 10-1319979 B1 | 10/2013 |
| KR | 10-2015-0026074 A | 3/2015 |

* cited by examiner

*Primary Examiner* — Josh Skroupa
(74) *Attorney, Agent, or Firm* — Morgan, Lewis & Bockius LLP

(57) ABSTRACT

A dynamic damper for a drive shaft may include a mass part fixed to the drive shaft, and a clamping band fixing the mass part to the drive shaft, to attenuate vibration and noise of the drive shaft, in which the clamping band may include a metallic inner banding member disposed on an outer surface of the drive shaft to correct a decrease in damping frequency when a temperature is increased, and an annular outer banding member disposed outside the inner banding member and pressing the inner banding member against the drive shaft to increase rigidity of the damper when the temperature is increased.

10 Claims, 3 Drawing Sheets

DYNAMIC DAMPER FOR DRIVE SHAFT

CROSS-REFERENCE TO RELATED APPLICATION

The present application claims priority to Korean Patent Application No. 10-2015-0042905 filed Mar. 27, 2015, the entire contents of which is incorporated herein for all purposes by this reference.

BACKGROUND OF THE INVENTION

Field of the Invention

The present invention relates to a damper device for a vehicle drive shaft. More particularly, the present invention relates to a dynamic damper which is provided with a clamping band that is improved to correct damping frequency by changing rigidity of the dynamic damper fixed to a drive shaft in accordance with a change in temperature in order to maintain an effect of the damper that reduces vibration and noise despite a change in temperature.

Description of Related Art

A drive shaft is used to transmit power generated by a vehicle engine to a wheel. Vibration is generated by the drive shaft applied to a medium-sized or small-sized vehicle when the drive shaft is rotated at a high speed. In this drive shaft, resonant frequency of a long shaft is 120 to 130 Hz, and resonant frequency of a short shaft is 260 to 300 Hz. In general, the resonant frequency matches with a portion vulnerable to acceleration noise and vibration of the vehicle, which mainly causes deterioration in noise, vibration and harshness (NVH) performance.

In order to solve the problem regarding the vibration, a dynamic damper, which is adapted to the resonant frequency, is mounted on the drive shaft to reduce vibration and noise.

However, control frequency of the dynamic damper applied to the drive shaft is sensitive to a temperature such that the control frequency is higher than target frequency in a cool state, and lower than target frequency in a hot state, and as a result, effects of reducing noise and vibration may be lowered or may deteriorate at the frequency with problems.

In order to solve the problem, as illustrated in FIG. 1, the prior art discloses a dynamic damper for a constant velocity joint, which is disposed on a drive shaft, the dynamic damper including a cylindrical main body 110 which is disposed on the drive shaft 1 and has a space therein; a first weight 130 which is disposed in the main body 110 in parallel with the drive shaft 1, a second weight 140 which is disposed on an inner circumferential surface of the main body 110 in a direction orthogonal to the drive shaft 1, and a filling material 120 which is stored in an internal space of the main body 110 to prevent the first and second weights 130 and 140 from being moved, in which the main body 110 includes a thermoplastic elastomer (TPE), and the filling material 120 includes a thermoplastic elastomer (TPE) having Shore hardness of 50 to 70 A.

The prior art discloses a damper which may change and adjust frequency properties of the damper by allowing a contact area between a fixing member and a mass member to be changeable.

As another example, prior art discloses a dynamic damper in which a metallic member is coupled to a rubber elastic member.

The dynamic damper in the related (prior) art uses rubber made of thermoplastic elastomer to prevent properties of the rubber from being greatly changed due to a change in temperature, but in a case in which the dynamic damper is made of this rubber material, damping force is relatively low, and effects of reducing vibration and noise deteriorate. Further, a number of improved methods of allowing the mass member of the damper to mainly correspond to a change in temperature have been proposed and result in significant effects, but because of various changes in temperature in view of the four seasons, a problem caused by a change in rigidity of the damper, which is caused by a change in coupling force of the damper to the drive shaft by a band that typically couples the damper to the drive shaft, cannot be solved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a dynamic damper which is provided with a clamping band that is improved to correct damping frequency with respect to a change in temperature by changing coupling rigidity of a damping mass part to the drive shaft in accordance with a change in temperature.

According to various aspects of the present invention, a dynamic damper for a drive shaft may include a mass part fixed to the drive shaft, and a clamping band fixing the mass part to the drive shaft, to attenuate vibration and noise of the drive shaft, in which the clamping band may include a metallic inner banding member disposed on an outer surface of the drive shaft so as to correct a decrease in damping frequency when a temperature is increased, and an annular outer banding member disposed outside the inner banding member and pressing the inner banding member against the drive shaft to increase rigidity of the damper when the temperature is increased.

The clamping band may include a bimetal, in which the inner banding member may include metal that has a larger coefficient of thermal expansion than that of the outer banding member.

The dynamic damper may be tuned in advance with respect to a use environment of a vehicle in a low temperature.

The clamping band may be in the form of a sandwich and include a vacant space portion formed between the inner banding member and the outer banding member, and the space portion may be filled with a fluid that has a larger coefficient of thermal expansion than metal of the inner and outer banding members.

The outer banding member may include metal that has relatively larger rigidity than metal of the inner banding member.

According to the dynamic damper of the present invention, the clamping band in which an inner portion and an outer portion have different coefficients of expansion is applied to a typical damping mass part, and as a result, it is possible to maintain the same NVH performance while maintaining performance of the existing damper regardless of a change in temperature. In addition, it is possible to conveniently apply the clamping band without changing the existing damper, thereby improving marketability of the dynamic damper.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
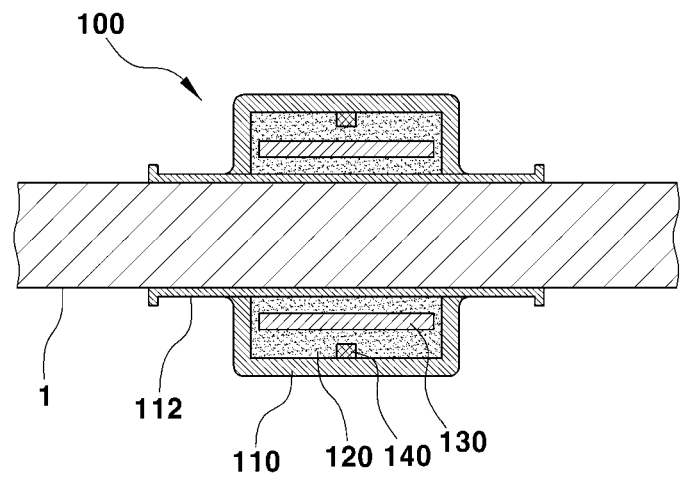
FIG. 1 is a schematic cross-sectional view of a dynamic damper for a vehicle in the related art.
Figure 2:
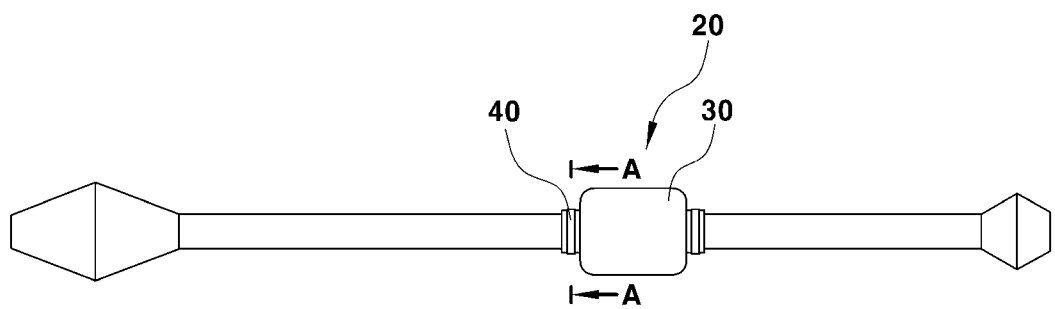
FIG. 2 illustrates a side view and a cross-sectional view in a state in which an exemplary dynamic damper according to the present invention is mounted to a drive shaft by a clamping band.

Referring to FIG. 2, a dynamic damper 20 according to the present invention, which is coupled to a drive shaft 60, includes a mass part 30, and a clamping band 40 which fixes the mass part to the drive shaft 60.

In general, the mass part 30 of the damper is made of a rubber material that is insensitive to a temperature, or includes two or more damping masses which have different weights and are in the form of filling materials or coupled bodies in other shapes so as to make the mass part 30 insensitive to a temperature.

While the mass part 30 is coupled to the drive shaft 60 by the clamping bands 40 disposed at both ends of the mass part 30 as illustrated in FIG. 2, the mass part 30 may be fixed to the drive shaft 60 by using a single clamping band, like in the case of prior art dynamic dampers.

Figure 3:
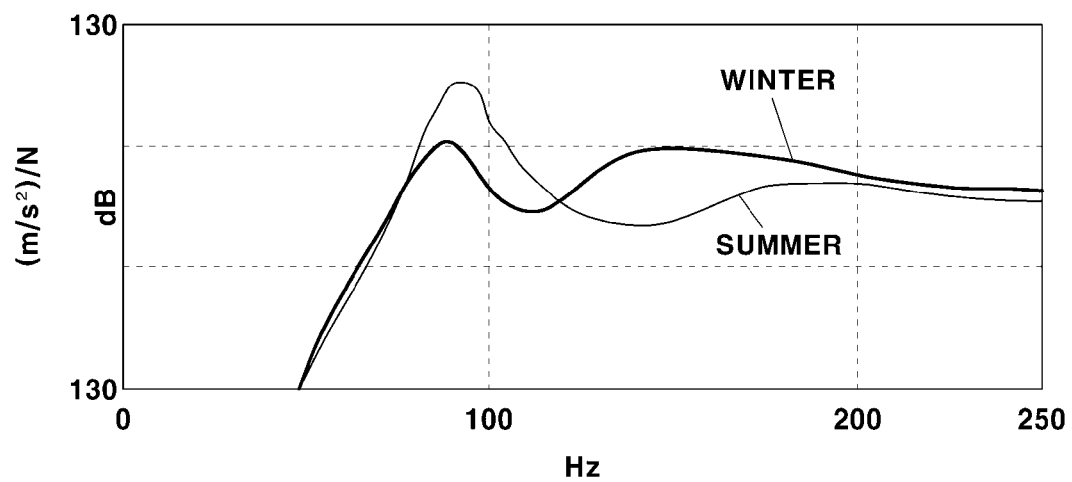
FIG. 3 is a graph illustrating a change in damping frequency with respect to a change in temperature.

Referring to FIG. 3, from analysis of natural frequency of the drive shaft 60, it can be seen that in a case in which the dynamic damper, which has the typical mass part made of a rubber material and is tuned in the summer, is applied, vibration and noise properties vary in response to a change of season (summer/winter). In general, as a temperature is increased, hardness of the rubber of the mass part is decreased, and damping frequency is decreased, and as a temperature is decreased, hardness of the rubber is increased, and damping frequency is increased.

In the present invention, in consideration of the fact that the damping frequency is proportional to a square root of a value made by dividing rigidity of the damper by a mass of the damper, coupling force of the clamping band is changed in response to a change in temperature, and a change in damping frequency of the damper due to a change in temperature may be corrected to prevent damper rigidity when the damper mass part is coupled to the drive shaft 60 from deteriorating while the clamping band expands as a temperature is increased.

That is, the clamping band 40 according to the present invention allows rigidity of the damper to be changed in accordance with a change in temperature, and as a result, effects of reducing vibration and noise are maintained within a frequency band with problems, thereby providing the dynamic damper for a drive shaft 60 which is suitable for varying temperatures.

Figure 4:
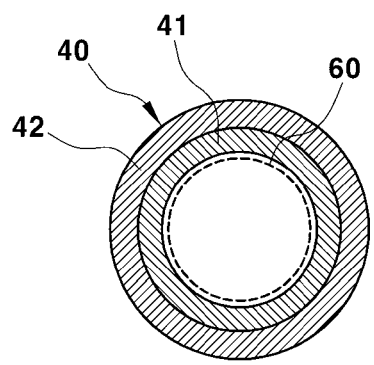
FIG. 4 is a schematic cross-sectional view of the clamping band for coupling the dynamic damper in FIG. 2 to the drive shaft.

To this end, the clamping band 40 according to the present invention is in the form of a bimetal made by attaching two metallic materials having different coefficients of thermal expansion, and as schematically illustrated in FIG. 4, the clamping band 40 includes a metallic annular inner banding member 41 which is disposed on an outer surface of the drive shaft 60, and an annular outer banding member 42 which is made of metal that has a relatively smaller coefficient of thermal expansion than the inner banding member 41, and disposed outside the inner banding member 41 to press the inner banding member 41 when a temperature is increased.

In this case, the dynamic damper 20 of the present invention is tuned with respect to a use environment of the vehicle in a low temperature (high damping frequency), and when a temperature is increased, the inner banding member 41 having a relatively larger coefficient of thermal expansion further expands to further press the drive shaft 60 disposed inside the inner banding member 41, thereby increasing rigidity. Therefore, the damping frequency is increased to correct a decrease in frequency of the dynamic damper due to an increase in temperature.

Figure 5:
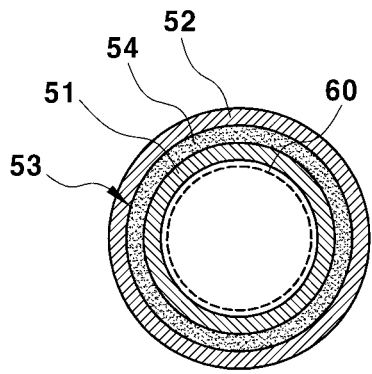
FIG. 5 is a schematic cross-sectional view of a clamping band which is different from the clamping band in FIG. 4.

FIG. 5 illustrates a clamping band 50 according to various embodiments. In the present various embodiments, the clamping band 50 is configured to be in the form of a sandwich in which a vacant space portion 53 is formed between an inner banding member 51 and an outer banding member 52, and the space portion is filled with a fluid 54 that has a larger coefficient of thermal expansion than metal. In this case, the outer banding member 52 may be made of metal that has relatively larger rigidity than metal of the inner banding member 51.

Similar to the various embodiments in FIG. 4, in the various embodiments of FIG. 5, a change in volume of the inner fluid 54, having a larger coefficient of thermal expansion, becomes relatively greater than that of the outer banding member 52 as a temperature is increased, and the volume of the fluid 54 expands toward the inner banding member 51 having relatively low rigidity, such that rigidity of the dynamic damper 20 becomes more than before the fluid expands, thereby correcting a decrease in frequency of the damper 20 due to an increase in temperature.

Figure 6:
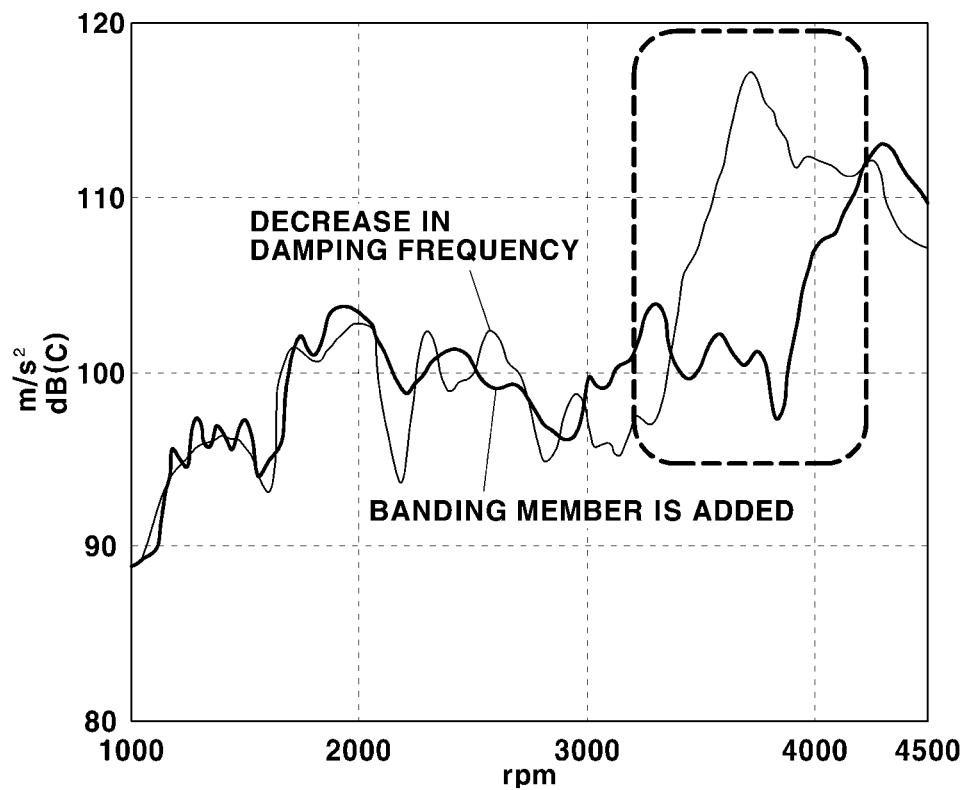
FIG. 6 is a graph illustrating a change in damping frequency when a temperature is increased in a case in which the improved clamping band according to the present invention is applied to the drive shaft and in a case in which the improved clamping band according to the present invention is not applied to the drive shaft.

FIG. 6 illustrates changes in vibration of a vehicle body and noise in a case in which a typical dynamic damper is applied to the drive shaft of an actual vehicle by using the clamping band of the present invention and in a case in which the typical dynamic damper is not applied to the drive shaft of the actual vehicle by using the clamping band 40 of the present invention. A black solid line indicates a graph when a typical damper is fixed by using a typical band, and a red solid line indicates a graph that illustrates a change in damping frequency when the clamping band 40 according to the present invention is applied. It can be seen in FIG. 6 that in the case of the typical dynamic damper, there is a problem in that when a temperature is increased, vibration of the vehicle body becomes significantly greater within a band of 3800 rpm while the damping frequency actually tuned is decreased, but in a case in which the same dynamic damper is fixed to the drive shaft by using the clamping band 40 according to the present invention, the damping frequency is corrected to be increased in accordance with a change in temperature, thereby improving vibration properties of the vehicle body by 15 dB or more.

The present invention may be conveniently applied and used to mount the existing dynamic damper to the drive shaft to attenuate vibration and noise by using the dynamic damper.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dynamic damper for a drive shaft, comprising:
a mass part fixed to the drive shaft; and
a clamping band fixing the mass part to the drive shaft, to attenuate vibration and noise of the drive shaft, wherein the clamping band comprises:
a metallic inner banding member disposed on an outer surface of the drive shaft to correct a decrease in damping frequency when a temperature is increased; and
an annular outer banding member, wherein an inner surface of the annular outer banding member is disposed on an outer surface of the inner banding member and is configured for pressing the inner banding member against the drive shaft,
wherein the metallic inner banding member and the annular outer banding member have different coefficients of thermal expansion such that rigidity of the damper is changed in accordance with a change in temperature.

2. The dynamic damper of claim 1, wherein the clamping band comprises a bimetal, wherein the inner banding member comprises metal that has a larger coefficient of thermal expansion than that of the outer banding member.

3. The dynamic damper of claim 2, wherein the dynamic damper is tuned in advance with respect to a use environment of a vehicle in a low temperature.

4. The dynamic damper of claim 1, wherein the clamping band is in the form of a sandwich and comprises a vacant space portion formed between the inner banding member and the outer banding member, and the space portion is filled with a fluid that has a larger coefficient of thermal expansion than metal of the inner and outer banding members.

5. The dynamic damper of claim 4, wherein the dynamic damper is tuned in advance with respect to a use environment of a vehicle in a low temperature.

6. The dynamic damper of claim 4, wherein the outer banding member comprises metal that has relatively larger rigidity than metal of the inner banding member.

7. The dynamic damper of claim 6, wherein the dynamic damper is tuned in advance with respect to a use environment of a vehicle in a low temperature.

8. The dynamic damper of claim 1, wherein the dynamic damper is tuned in advance with respect to a use environment of a vehicle in a low temperature.

9. A dynamic damper for a drive shaft, comprising:
a mass part fixed to the drive shaft; and
a clamping band fixing the mass part to the drive shaft, to attenuate vibration and noise of the drive shaft, wherein the clamping band comprises:
a metallic inner banding member disposed on an outer surface of the drive shaft to correct a decrease in damping frequency when a temperature is increased; and
an annular outer banding member, wherein an inner surface of the annular outer banding member is disposed on an outer surface of the metallic inner banding member and is configured for pressing the inner banding member against the drive shaft,
wherein the metallic inner banding member and the annular outer banding member have different rigidities such that a rigidity of the damper is changed in accordance with a change in temperature.

10. A dynamic damper for a drive shaft, comprising:
a mass part fixed to the drive shaft; and
a clamping band fixing the mass part to the drive shaft, to attenuate vibration and noise of the drive shaft, wherein the clamping band comprises:
a metallic inner banding member disposed on an outer surface of the drive shaft to correct a decrease in damping frequency when a temperature is increased;
a first annular outer banding member, wherein an inner surface of the first annular outer banding member is disposed on an outer surface of the metallic inner banding member and is configured for pressing the inner banding member against the drive shaft a second annular outer banding member disposed on an outer surface of the first annular outer banding member and pressing the first annular outer banding member against the drive shaft, wherein the metallic inner banding member, the first annular outer banding member and the second annular outer member have different coefficients of thermal expansion such that rigidity of the damper is changed in accordance with a change in temperature.

\* \* \* \* \*